(12) United States Patent
Chen (10) Patent No.: US 12,443,050 B2
(45) Date of Patent: Oct. 14, 2025

(54) SNAP-FIT DEVICE FOR SPECTACLE LENS AND SPECTACLE FRAME (71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 554 days.

(21) Appl. No.: 17/869,271

(22) Filed: Jul. 20, 2022

(65) Prior Publication Data
US 2023/0078267 A1 Mar. 16, 2023

(30) Foreign Application Priority Data
Sep. 15, 2021 (TW) ................................ 110210958

(51) Int. Cl.
*G02C 1/04* (2006.01)
*G02C 5/02* (2006.01)
(Continued)

(52) U.S. Cl.
CPC ................. *G02C 1/04* (2013.01); *G02C 5/02* (2013.01); *G02C 5/06* (2013.01); *G02C 5/22* (2013.01); *G02C 2200/04* (2013.01)

(58) Field of Classification Search
CPC ........ G02C 1/04; G02C 1/10; G02C 2200/04; G02C 2200/08; G02C 5/02; G02C 5/06; G02C 5/22
See application file for complete search history.

(56) References Cited
U.S. PATENT DOCUMENTS 7,922,320 B1 * 4/2011 Tsai .......................... G02C 1/06
351/86
9,766,480 B1 * 9/2017 Chou ....................... G02C 9/00
(Continued)

FOREIGN PATENT DOCUMENTS

KR 20160043442 A * 4/2016
TW M508692 U * 9/2015
WO WO-2020152461 A1 * 7/2020 ............... G02C 1/02

OTHER PUBLICATIONS

Snap-Fit Design Manual, 2007, pp. 1-24 [online], [retrieved Dec. 19, 2024], retrieved from the Internet <URL: file:///C:/Users/washton/Downloads/Snap-FitDesignManual%20(1).pdf>. (Year: 2007).*

*Primary Examiner* — James R Greece
(74) *Attorney, Agent, or Firm* — Rosenberg, Klein & Lee (57) ABSTRACT

The present invention relates to a snap-fit device for spectacle lens and spectacle frame, which mainly provides a spectacle frame comprising a lens assembly portion having an embedding groove arranged on the periphery thereof, so as for an upper edge and two sides of a lens to be embedded in the embedding groove of the lens assembly portion, wherein the lens assembly portion further has a first locking portion and a second locking portion respectively provided on two sides thereof. Thereby, when assembling, a second locking slot arranged on one side of the lens is firstly engaged with the second locking portion of the spectacle frame. The device provided by the present invention does not require any hand tools during the lens assembling and replacement process, and does not require bending or deforming the lens, which achieves the effect of easy lens assembly and replacement.

12 Claims, 11 Drawing Sheets (51) Int. Cl.
    *G02C 5/06*     (2006.01)
    *G02C 5/22*     (2006.01)

(56) References Cited

U.S. PATENT DOCUMENTS

| | | | |
|---|---|---|---|
| 10,359,642 B2 * | 7/2019 | Calilung | G02C 1/02 |
| 2011/0194065 A1 * | 8/2011 | Belbey | F41H 1/00 |
| | | | 351/60 |
| 2014/0218677 A1 * | 8/2014 | Chen | G02C 5/146 |
| | | | 351/140 |
| 2017/0023795 A1 * | 1/2017 | Chen | G02C 1/04 |
| 2017/0075134 A1 * | 3/2017 | Chen | G02C 5/146 |
| 2017/0100287 A1 * | 4/2017 | Calilung | A61F 9/025 |
| 2017/0357104 A1 * | 12/2017 | Chen | G02C 5/146 |
| 2019/0235272 A1 * | 8/2019 | Otra | G02C 5/006 |

\* cited by examiner

SNAP-FIT DEVICE FOR SPECTACLE LENS AND SPECTACLE FRAME

BACKGROUND OF THE PRESENT INVENTION

Field of the Invention

The present invention relates to the technical field of eyeglasses, and in particular, to a snap-fit device for spectacle lens and spectacle frame.

Description of Related Art

It is noted that when assembling the lens for conventional half-frame glasses, the lens has to be bent and deformed in order to have the embedded flanges on both sides of the lens be embedded in and positioned at the embedded recesses on the two sides of the lens assembly part of the frame. However, this assembly method of bending and deforming the lens as well as forcing them into the frame requires a certain physical strength, and there is risk to damage to the lens and the frame, so it is inconvenient to assemble and disassemble the lens. In addition, the assembly of conventional half-frame glasses lacks stability that when the lens is impacted by external force, they can easily separate from the frame and fall off.

SUMMARY OF THE PRESENT INVENTION

A main object of the present invention is to provide snap-fit device for spectacle lens and spectacle frame, which can stably assemble and combine the lens and the frame, and allow easy assembly and replacement of the lens and the frame.

DETAILED DESCRIPTION OF THE PREFERRED EMBODIMENT

Figure 1:
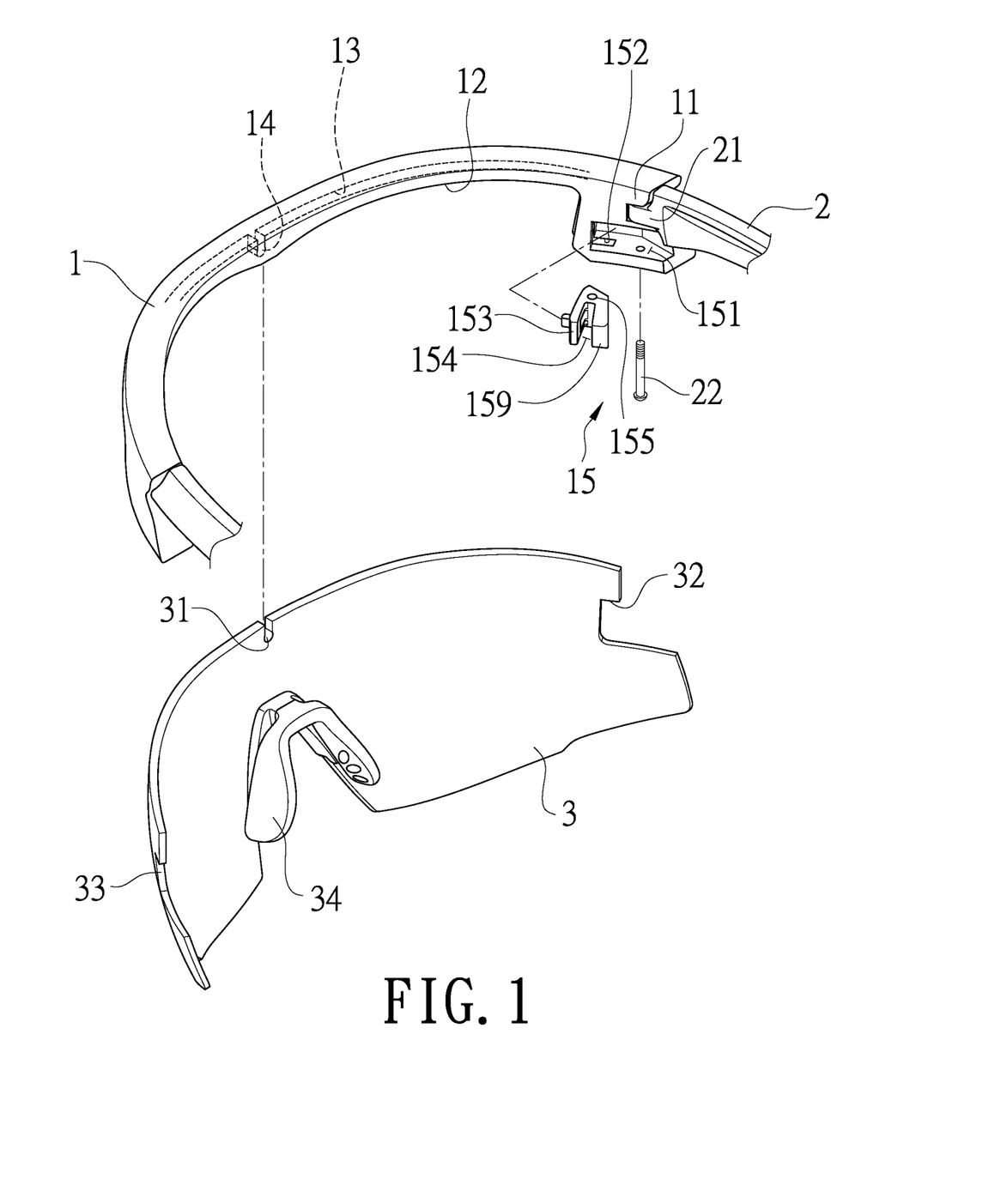
FIG. 1 is an exploded view of a first embodiment according to the present invention.
Figure 2:
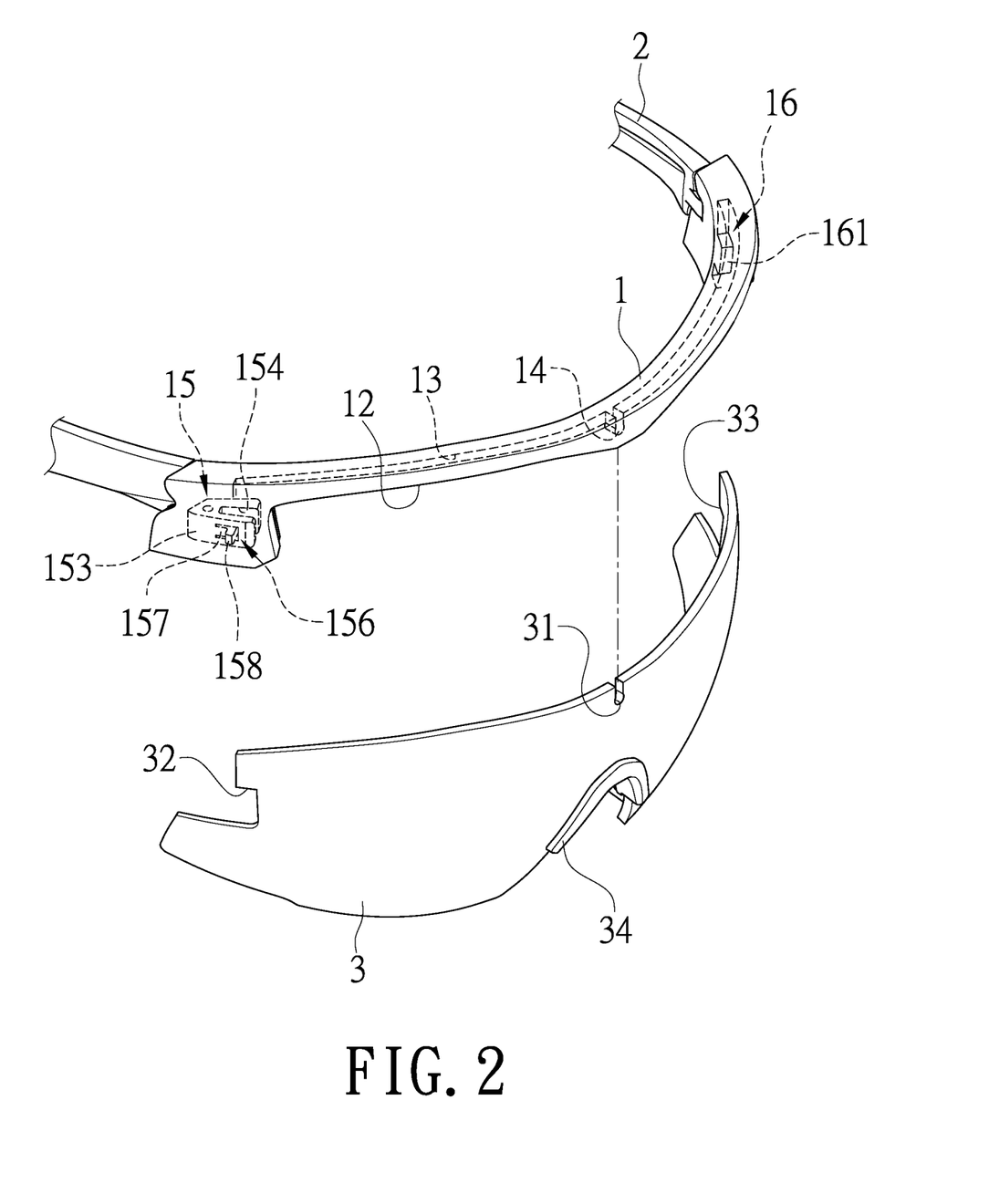
FIG. 2 is another exploded view of the first embodiment according to the present invention.
Figure 3:
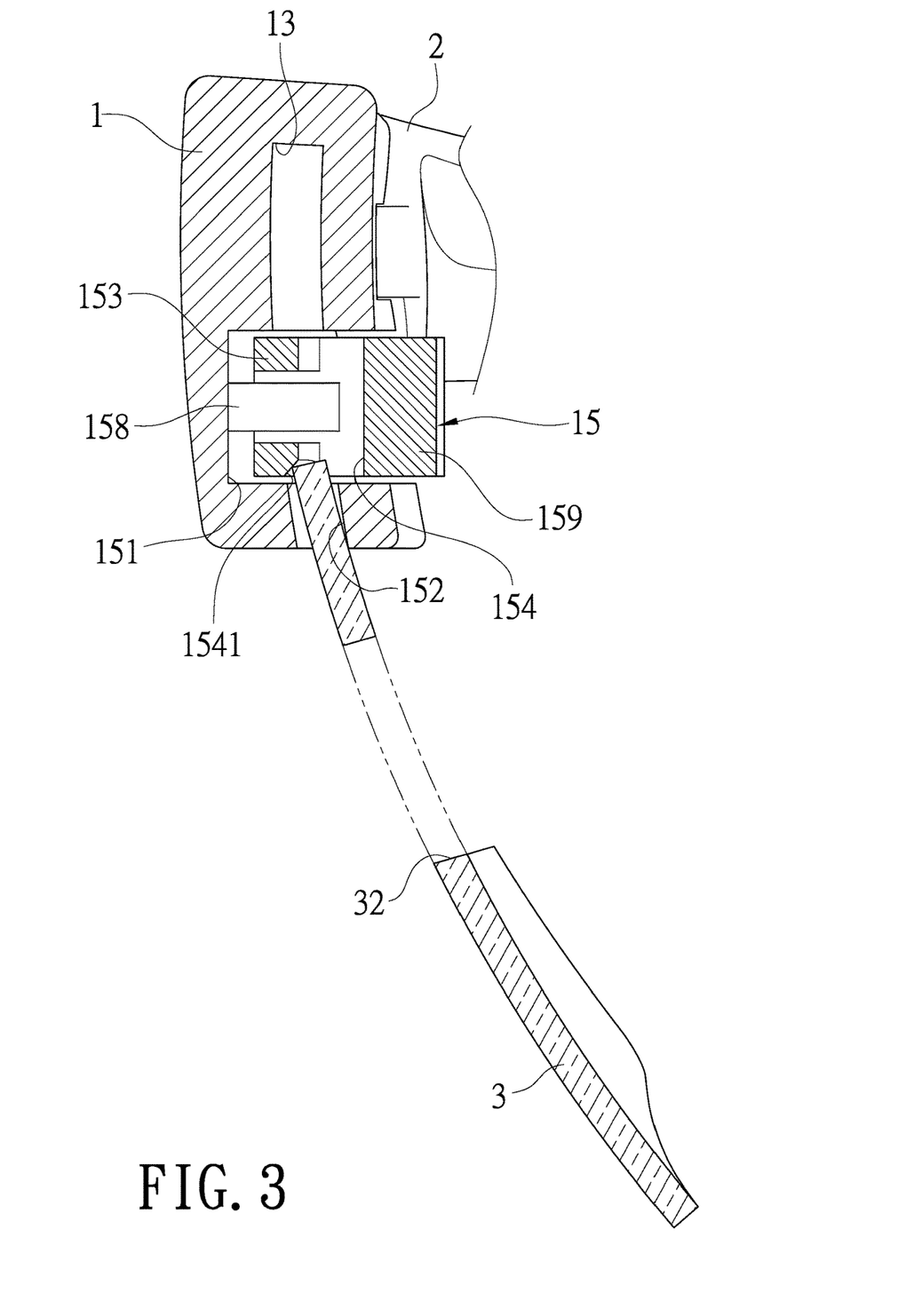
FIG. 3 is a sectional view of the first embodiment during assembly according to the present invention.

Referring to FIGS. 1 and 2, a spectacle lens and frame snap-fit device according to the present invention includes:

a spectacle frame 1, wherein a bottom side of the spectacle frame 1 has an open portion, so that the spectacle frame 1 is in a half-frame shape, wherein the spectacle frame 1 comprises a temple pivot portion 11 disposed on each of the left and right sides thereof, and a lens assembly portion 12 disposed thereon, wherein the lens assembly portion 12 has an embedding groove 13 formed along the periphery thereof, a first positioning portion 14, which may be embodied as a protruding post, disposed in a middle of the embedding groove 13, and a first locking portion 15 and a second locking portion 16 respectively arranged on the left and right sides of the lens assembly portion 12, wherein the first locking portion 15 includes a first assembly groove 151 provided on an inner surface of the spectacle frame 1, wherein the first assembly groove 151 intersects with the embedding groove 13 of the same side, and form a cut 152 at the intersection, wherein the first locking portion 15 further includes a first latching member 153 disposed in the first assembly groove 151, a gap 154 arranged on a side of the first latching member 153 corresponds to the cut 152 of the first assembly groove 151, wherein the first latching member 153 has a pivot hole 155 arranged on the other side of the first latching member 153 opposite to the gap 154, wherein the first latching member 153 further has an elastic portion 156 disposed on the side thereof that faces a bottom of the first assembly groove 151, wherein the elastic portion 156 includes an elastic piece 157 separated from the first latching member 153 on its periphery except for the side connected with the first latching member 153, and a supporting block 158 protruded from the elastic piece 157, so that the supporting block 158 is abutted on the bottom of the first assembly groove 151, wherein the gap 154 has an inclined surface 1541 at the bottom edge of the wall adjacent to the elastic portion 156, as illustrated in FIG. 3, wherein the first latching member 153 has a pressing portion 159 formed on the opposite side of the elastic portion 156, so that the pressing portion 159 protrudes from an opening of the first assembly groove 151, wherein the second locking portion 16 is a locking protrusion 161 formed in the embedding groove 13;

two temples 2, each having a frame pivot portion 21 arranged on the front ends thereof, so as to be coupled with the temple pivot portions 11 arranged on the two sides of the spectacle frame 1 respectively, and a pivot shaft 22, passing through the junction of the frame pivot portions 21 and the temple pivot portions 11 respectively, so that the two temples 2 are respectively pivotally connected with the spectacle frame 1, wherein one of the pivot shafts 22 passes through the pivot hole 155 of the first latching member 153 of the first locking portion 15 of the spectacle frame 1, so that the first latching member 153 is pivotally connected with the first assembly groove 151 of the first locking portion 15; and a lens 3, arranged on the lens assembly portion 12 of the spectacle frame 1, wherein an upper edge and the left and right sides of the lens 3 are embedded in the embedding groove 13 of the lens assembly portion 12, wherein the lens 3 has a second positioning portion 31 provided in a middle of the upper edge thereof, wherein the second positioning portion 31 may be embodied as a longitudinal recess, so as to be correspondingly positioned and coupled with the protruding post provided on the first positioning portion 14 of the spectacle frame 1, wherein the lens 3 further has a first locking slot 32 and a second locking slot 33 arranged on the left and right sides thereof respectively, wherein a side of the lens 3 with the first locking slot 32 passes through the cut 152 of the first assembly groove 151 and the gap 154 of the first latching member 153, so that the position of the first locking slot 32 on the side and the position of the first assembly groove 151 of the spectacle frame 1 are corresponding to and aligned with each other, wherein the first latching member 153 is correspondingly engaged with the first locking slot 32, wherein the second locking slot 33 is correspondingly engaged with the locking protrusion 161 of the second locking portion 16 of the spectacle frame 1, wherein the lens 3 further has a nose pad 34 arranged in a middle of the lower edge thereof.

Figure 4:
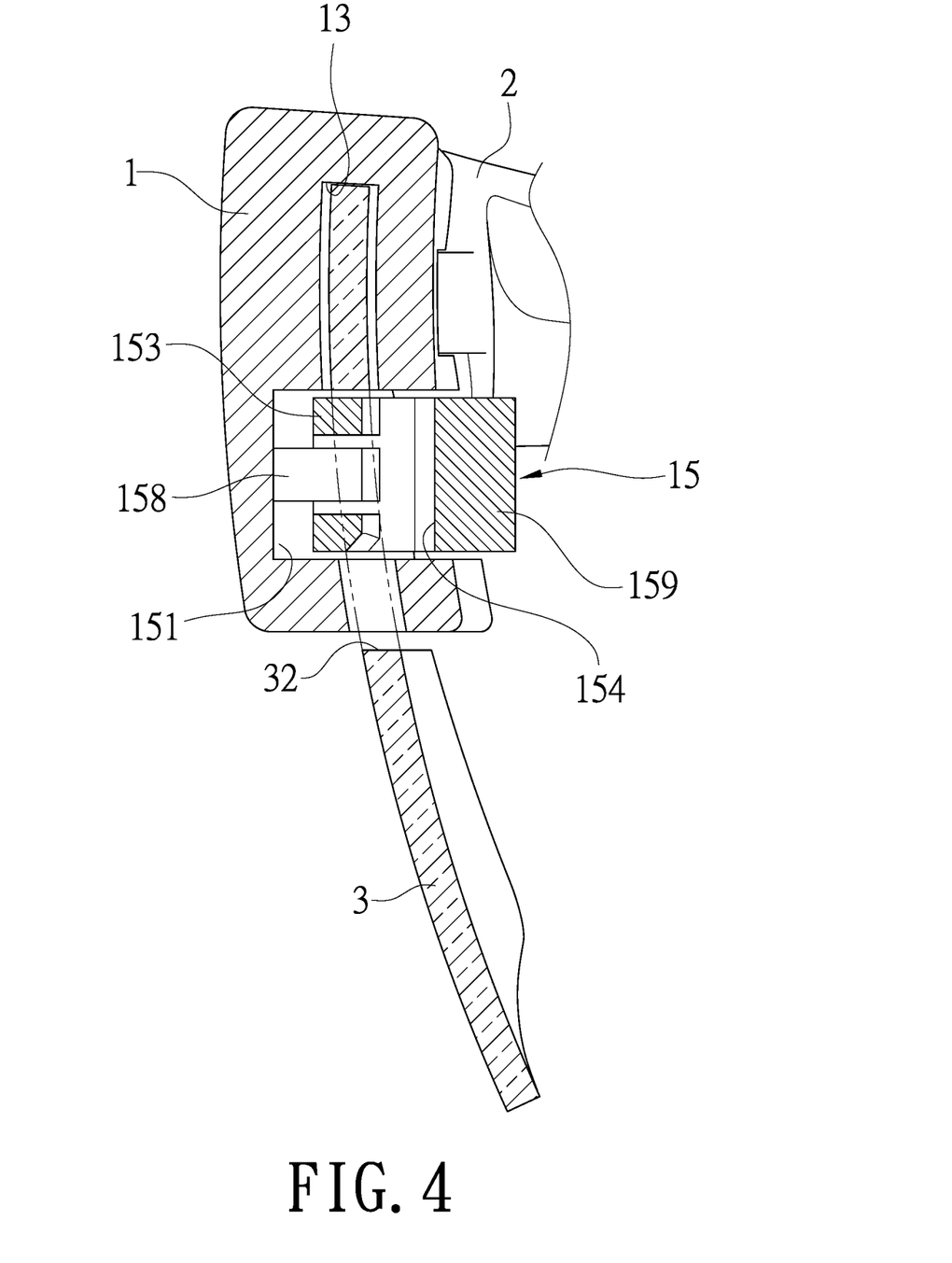
FIG. 4 is another sectional view of the first embodiment in an assembled state according to the present invention.
Figure 5:
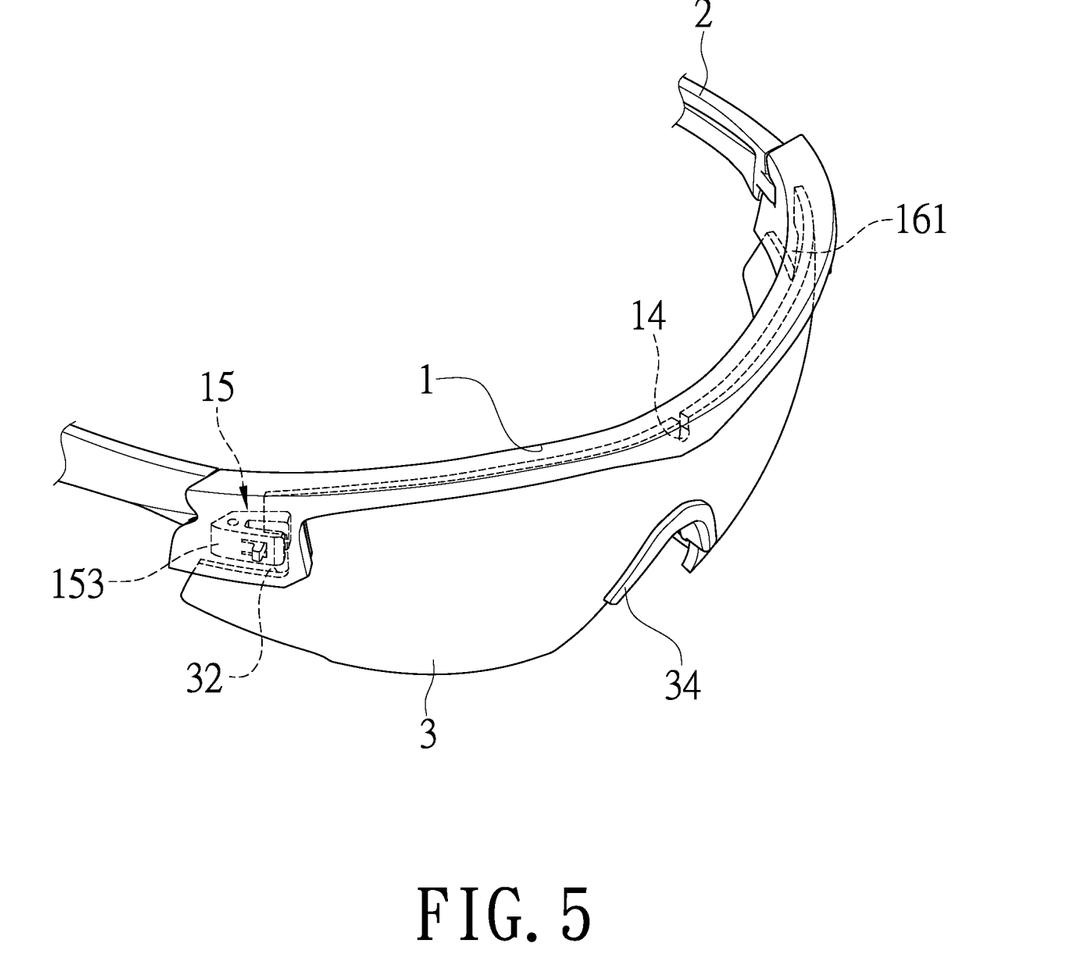
FIG. 5 is a perspective view of the first embodiment according to the present invention.

Accordingly, when assembling the lens 3 and the spectacle frame 1, the user sets the lens 3 at the lens assembly portion 12 of the spectacle frame 1, and the side of the lens 3 with the second locking slot 33 is firstly inserted into the side of the embedding groove 13 of the spectacle frame 1 to be correspondingly engaged with the locking protrusion 161 of the second locking portion 16 provided on the side. Then the upper edge of the lens 3 is inserted into an upper edge of the embedding groove 13 of the spectacle frame 1, so that the second positioning portion 31 of the longitudinal recess formed on the upper edge of the lens 3 and the first positioning portion 14 of the protruding post formed on the upper edge of the embedding groove 13 are correspondingly engaged with each other. Referring to FIG. 3, the side of the lens 3 with the first locking slot 32 can then pass through the cut 152 of the first assembly groove 151, wherein when entering the gap 154 of the first latching member 153, the upper edge of the lens 3 will abut against the inclined surface 1541 formed on the bottom edge of the wall of the gap 154 so as to generate a horizontal forward-pushing component force at the inclined surface 1541, so as to move the first latching member 153 forward, so that the position of the gap 154 of the first latching member 153 aligns and corresponds to the position of the cut 152 of the first assembly groove 151. Hence, the side of the first locking slot 32 of the lens 3 is inserted into the embedding groove 13 for positioning after passing through the cut 152 of the first assembly groove 151 and the gap 154 of the first latching member 153. At this time, the position of the first locking slot 32 is corresponding to the first assembly groove 151. Also referring to FIG. 4, the first latching member 153 is shifted forward, so that the pressed elastic piece 157 will return to its original state, so that the first locking piece 153 can be pushed back and reset, so as to be correspondingly snapped and engaged with the first locking slot 32 of the lens 3. Here, the assembling of the lens 3 and the spectacle frame 1 is completed, as illustrated in FIG. 5.

Figure 6:
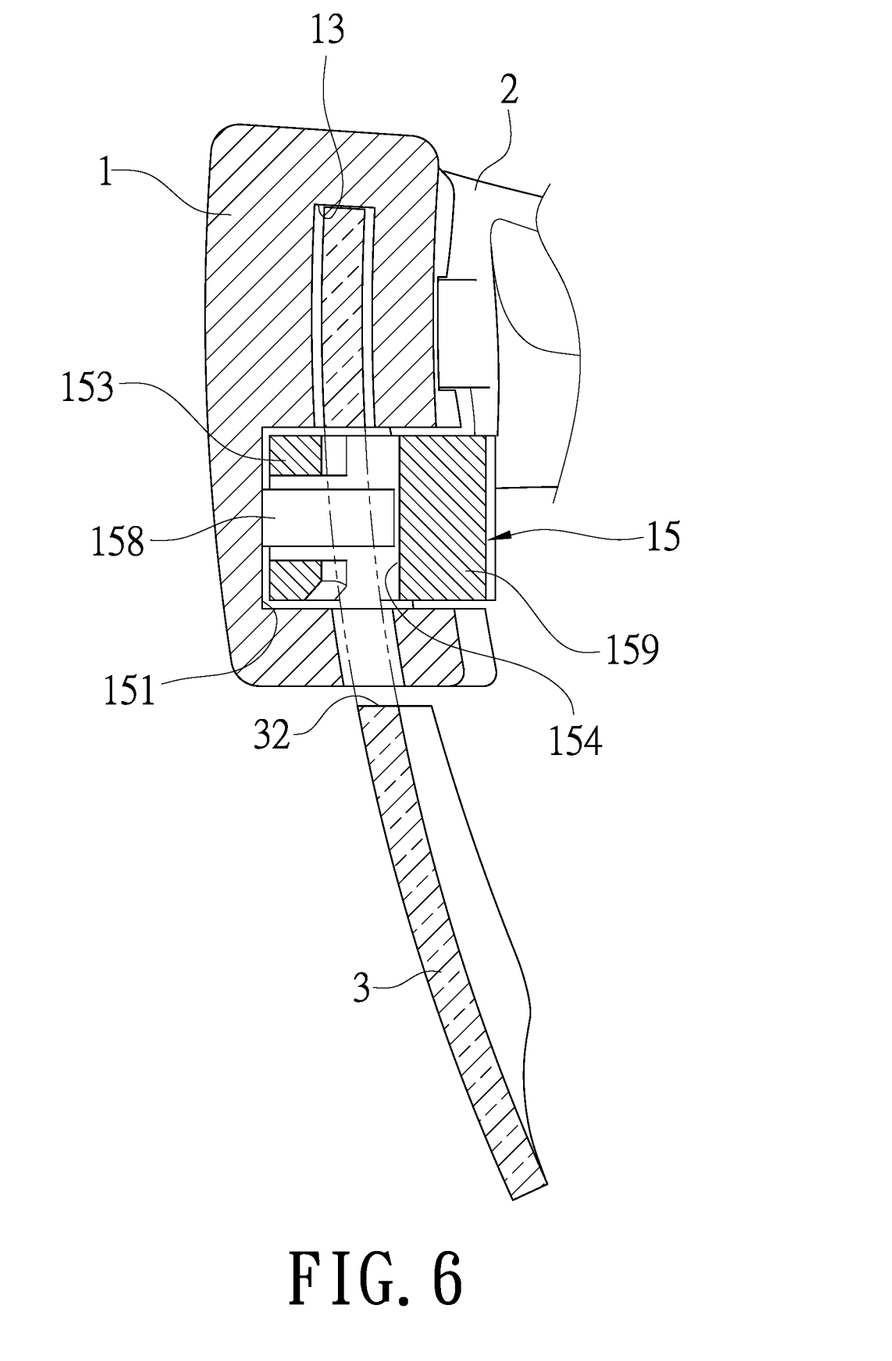
FIG. 6 is a sectional view of the first embodiment in a disassembled state according to the present invention.

Furthermore, when the user wants to remove the lens 3 from the spectacle frame 1, the operation is reversed. Referring to FIG. 6, first, the user may press the pressing portion 159 of the first latching member 153, so as to have the gap 154 of the first latching member 153 be correspondingly to the position of the cut 152 formed in the first assembly groove 151 of the spectacle frame 1. At the same time, the first locking slot 32 of the lens 3 will also be released from the snap-fit state with the first latching member 153. Then, the user may pull down the side of the first locking slot 32 of the lens 3 so as to have it pass through the gap 154 of the first latching member 153 and the cut 152 of the first assembly groove 151 to be separated from the spectacle frame 1. Next, the second positioning portion 31 of the concave provided on the upper edge of the lens 3 is separated from the first positioning portion 14 of the protruding post provided on the upper edge of the embedding groove 13 of the spectacle frame 1. Further, the second locking slot 33 of the lens 3 is released from the snap-fit state with the locking protrusion 161 of the second locking portion 16 of the spectacle frame 1, so as to allow the lens 3 to be removed from the spectacle frame 1 for easily replace the lens 3 or the spectacle frame 1. Thereby, in the process of assembling and replacing the lens 3 according to the present invention, it is not necessary to utilize any hand tools, and it is not necessary to bend and deform the lens 3 laboriously, which achieves the effect of facilitating the assembly and disassembly of the lens 3 and the spectacle frame 1. In addition, according to the present invention, besides of the two sides of the lens 3 and the spectacle frame 1 are provided with an engaging structure, the upper edge of the lens 3 and the positioning structure in the middle of the embedding groove 13 of the spectacle frame 1 are utilized to form a three-point engagement structure, so as to increase the stability of the assembling of the lens 3 and the spectacle frame 1.

Figure 7:
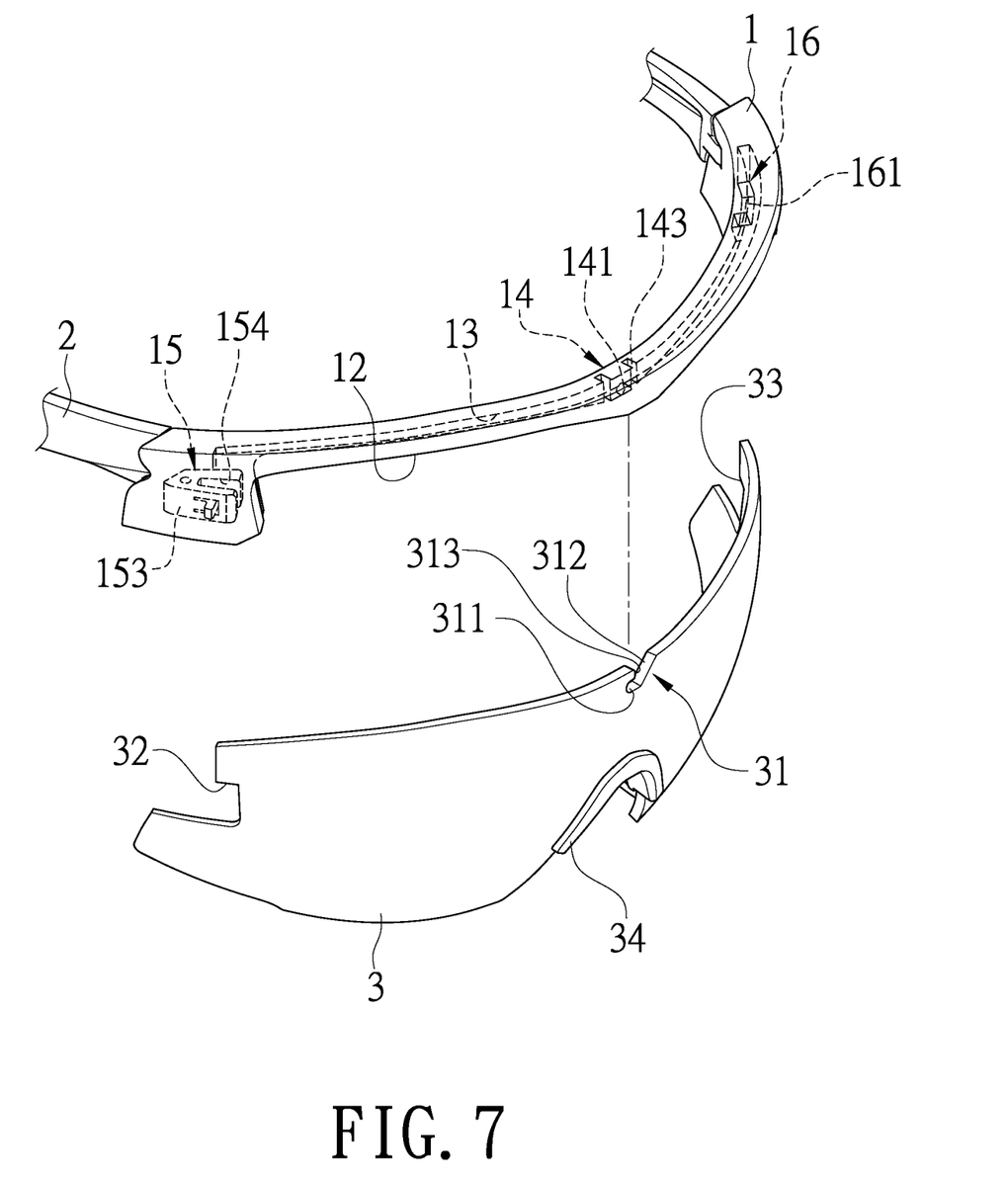
FIG. 7 is an exploded view of a second embodiment according to the present invention.
Figure 8:
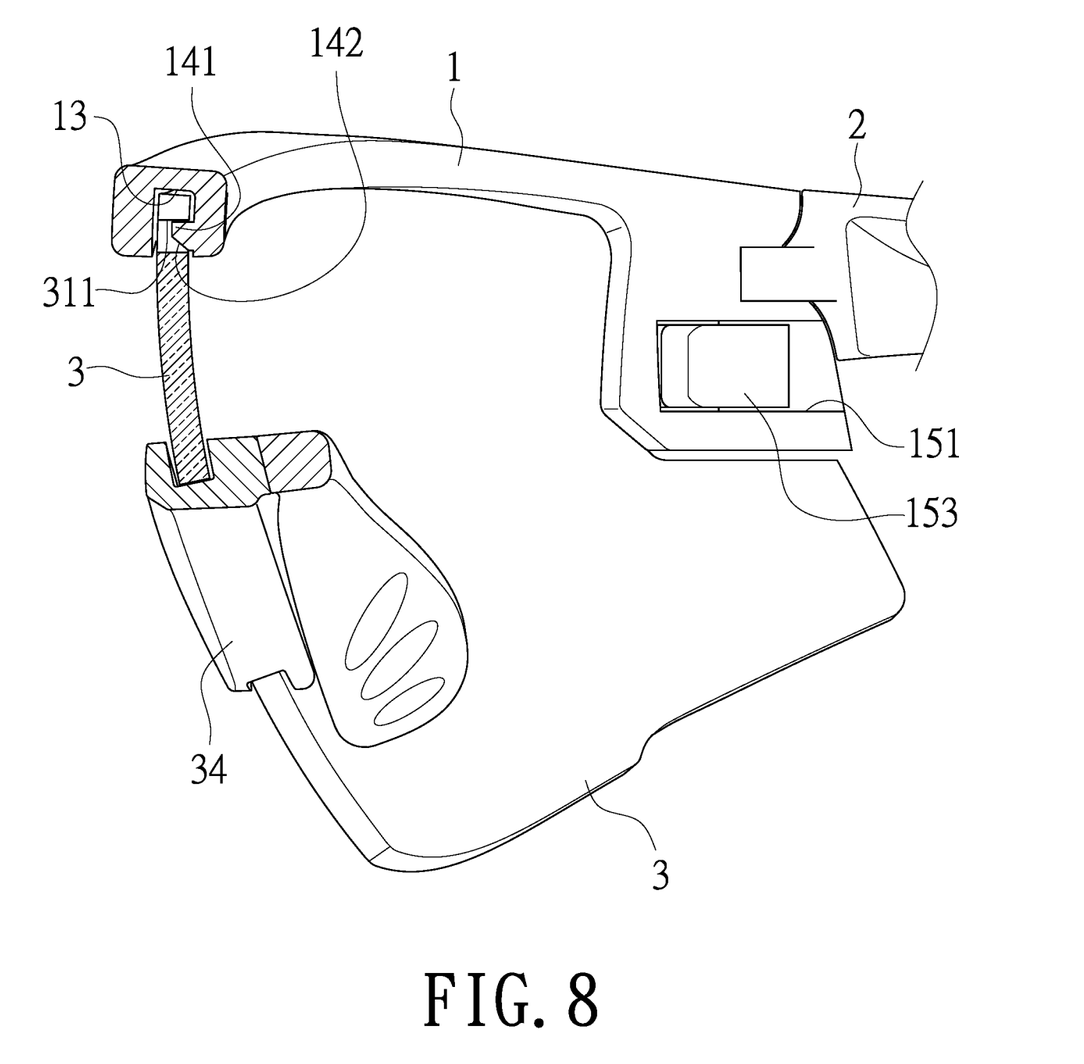
FIG. 8 is a sectional view of the second embodiment according the present invention.
Figure 9:
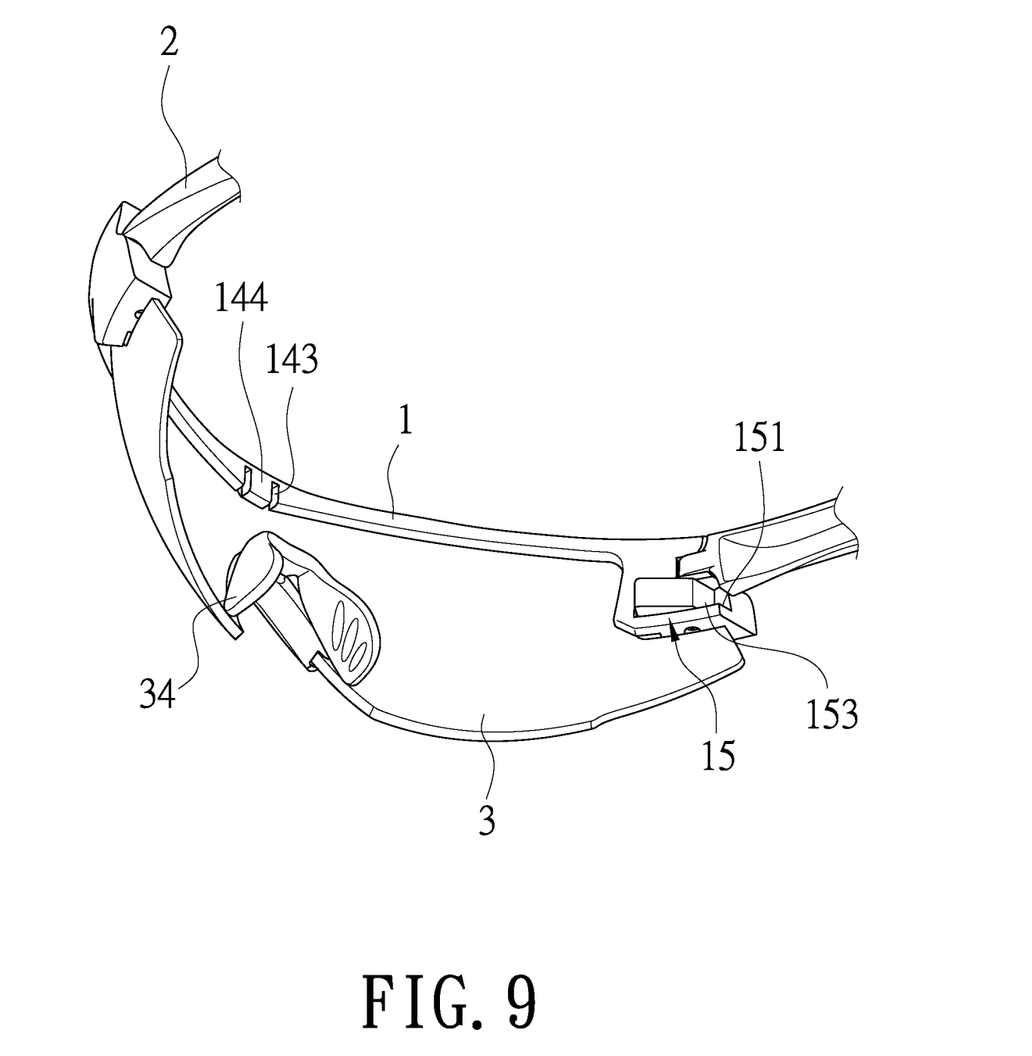
FIG. 9 is a perspective view of the second embodiment according the present invention.

Referring to FIGS. 7-9, a snap-fit device for spectacle lens and spectacle frame according to a second embodiment of the present invention is illustrated. According to the present invention, the first positioning portion 14 of the spectacle frame 1 has a protruding post 141 formed in the embedding groove 13, a slope 142 formed on a bottom side of the protruding post 141, two ditches 143 arranged on the inner surface of the spectacle frame 1 in the left and right sides of the protruding post 141 respectively and communicated with the embedding groove 13, and an elastic piece 144 formed between the two ditches 143 on the inner surface of the spectacle frame 1, wherein the second positioning portion 31 of the lens 3 has a transverse recess 311 arranged at the lower part adjacent to the upper edge of the lens 3, an oblique guide groove 312 chamfered downward from the upper edge of the lens 3 to the transverse recess 311 and connected with the transverse recess 311, and an opening 313 arranged on the upper edge of the lens 3 in the manner of intersecting with the transverse recess 311 and the oblique guide groove 312. Thereby, after the second locking slot 33 of the lens 3 is engaged with the locking protrusion 161 of the second locking portion 16 of the spectacle frame 1, the lens 3 may be directly moved upwards, so that the protruding post 141 of the spectacle frame 1 passes through the opening 313 provided on the upper edge of the lens 3 to the transverse recess 311. When the slope 142 on the bottom side of the protruding post 141 abuts against the transverse recess 311 of the lens 3, a horizontal component force that pushes back will be generated at the slope 142 of the protruding post 141, so that the elastic piece 144 positioned at the protruding post 141 is moderately stretched back, so as to allow an upper edge of the spectacle frame 1 to be inserted into the embedding groove 13 of the spectacle frame 1, and the lens 3 may be moved laterally so that the protruding post 141 can be engaged into the end of the transverse recess 311 for stable positioning. Then the first locking slot 32 of the lens 3 is engaged with the first latching member 153 of the first locking portion 15 of the frame 1, so as to complete the assembling of the lens 3 and the spectacle frame 1. In addition, when the first positioning portion 14 of the spectacle frame 1 and the second positioning portion 31 of the lens 3 are to be released from the engagement state, the protruding post 141 of the first positioning portion 14 of the spectacle frame 1 may move laterally along the transverse recess 311 of the lens 3 to the oblique guide groove 312, and then slide out along the oblique guide groove 312 to be separated from the lens 3.

Figure 10:
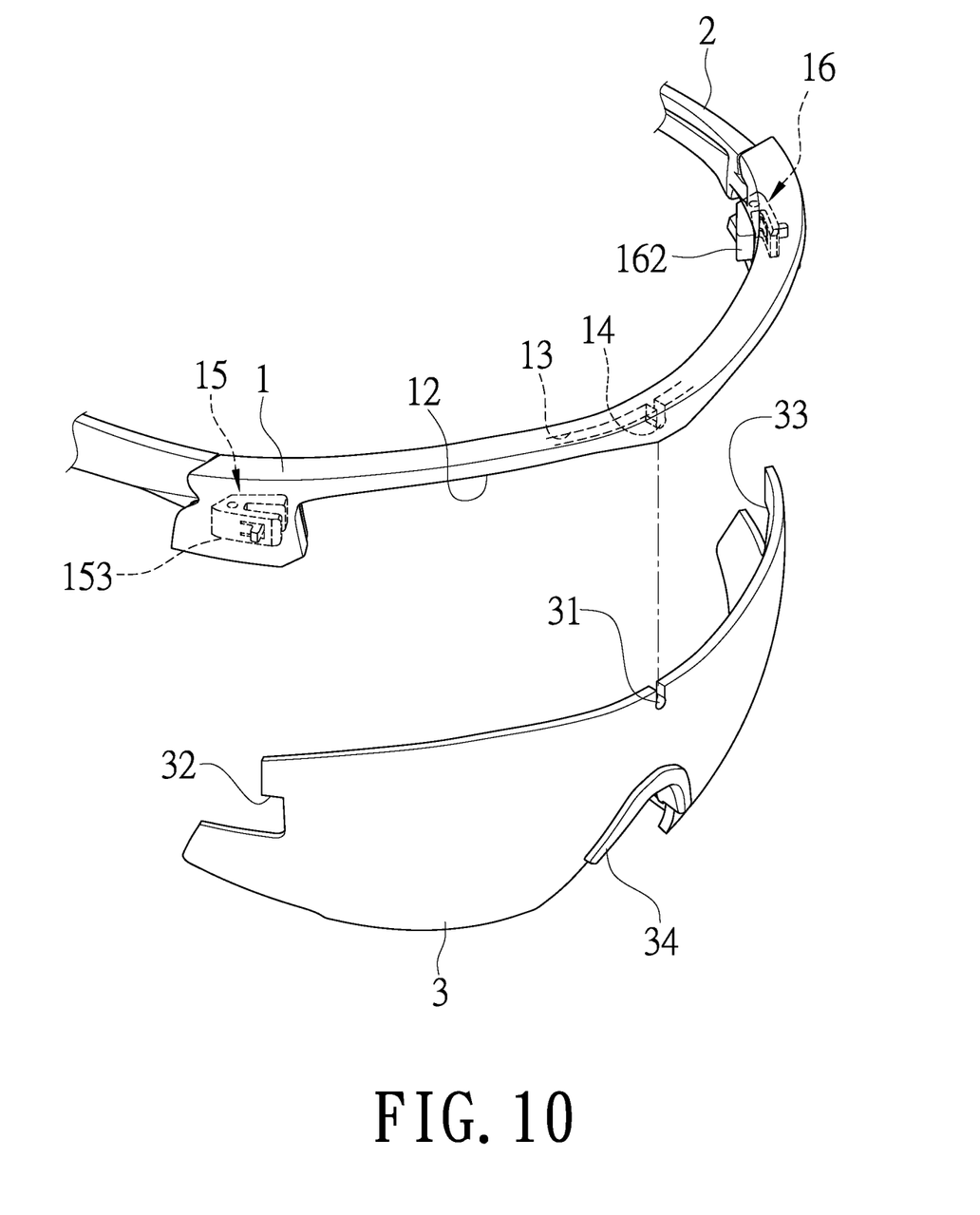
FIG. 10 is an exploded view of a third embodiment according the present invention.

Referring to FIG. 10, a snap-fit device for spectacle lens and spectacle frame according to a third embodiment of the present invention is illustrated. According to the present invention, the second locking portion 16 and the first locking portion 15 of the spectacle frame 1 may also have the same structure, so that the second locking portion 16 also has a second assembly groove, and a second latching member 162 pivotally connected in the second assembly groove, and etc. Thereby, the first locking portion 15 and the second locking portion 16 of the spectacle frame 1 are engaged with the first locking slot 32 and the second locking slot 33 of the lens 3 through the first latching member 153 and the second latching member 162 respectively, which increases the convenience in assembling the lens 3 and the spectacle frame 1.

Figure 11:
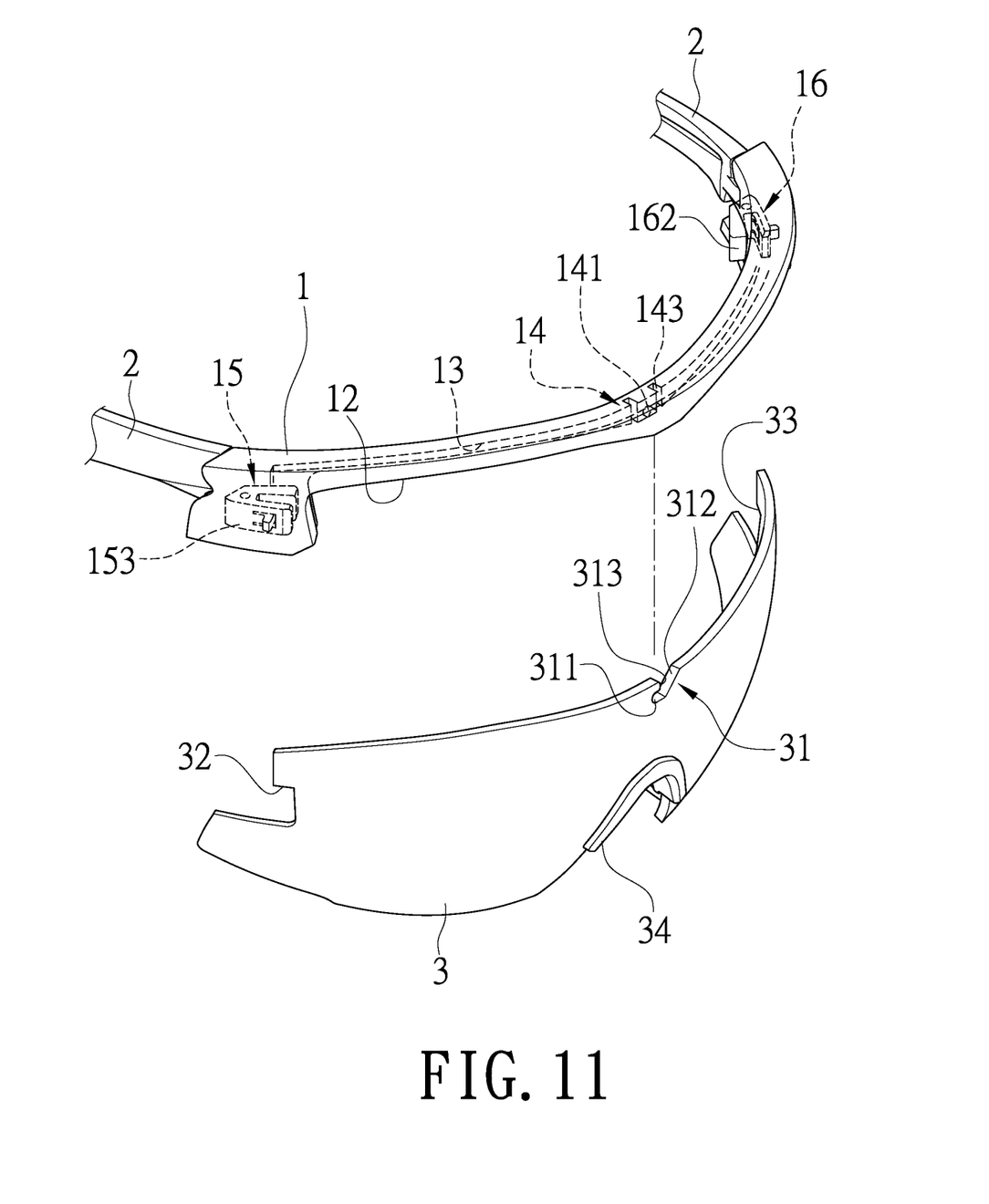
FIG. 11 is an exploded view of a fourth embodiment according the present invention.

Referring to FIG. 11, a snap-fit device for spectacle lens and spectacle frame according to a fourth embodiment of the present invention is illustrated. In the present invention, besides allowing the first locking portion 15 and the second locking portion 16 of the spectacle frame 1 to be respectively engaged with the first locking slot 32 and the second locking slot 33 of the lens 3 through the first latching member 153 and the second latching member 162, it also allows the protruding post 141 of the first positioning portion 14 of the spectacle frame 1 and the transverse recess 311, the oblique guide groove 312, and the intersecting opening 313 of the second positioning portion 31 of the lens 3 to further be coupled with each other, so as to further improve the convenience and stability of the assembly of the lens 3 and the spectacle frame 1.

What is claimed is:

1. A snap-fit device for spectacle lens and spectacle frame, comprising:
a spectacle frame formed in a half-frame shape, and a lens assembly portion formed on the spectacle frame to extend between two opposing ends thereof, and a first locking portion and a second locking portion formed on the two opposing ends the spectacle frame, respectively, wherein each of the first and second locking portions is formed at the respective end of the spectacle frame to be in communication with a corresponding section of the lens assembly portion, wherein the lens assembly portion includes an embedding groove extending along a periphery of the spectacle frame between the two opposing ends thereof to communicate with a corresponding one of the first and second locking portions, the first locking portion including a first assembly groove formed at a corresponding inner surface of the spectacle frame for being intersected with a corresponding section of the embedding groove to thereby form a first cut at a portion of an intersection of the first assembly groove and the embedding groove, the first locking portion, further, including a first latching member disposed in the first assembly groove and the first latching member including at least a first sidewall portion formed within the first assembly groove to thereby be disposed internally with respect to the spectacle frame, wherein the first sidewall portion is pivotally connected to the first assembly groove at an end of the first latching member, and the first latching member, further, including a first gap formed within the first latching member to be correspondingly shaped with the first cut, wherein the first gap is formed at an end of the first latching member opposed to the end at which the first latching member is pivotally connected with the first assembly groove, wherein the first sidewall portion of the first latching member includes a first elastic portion arranged at a side portion thereof, the first elastic portion being formed through only the corresponding side portion of the first sidewall portion, thereby only the portion of the first sidewall portion through which the first elastic portion is formed is elastic, and a first pressing portion is formed on a surface of the first latching member physically separated from the first sidewall portion, wherein the first pressing portion protrudes out of an opening formed at an open side section of the first assembly groove; and
a lens configured to be arranged at the lens assembly portion of the spectacle frame whereby an upper edge and two opposing sides of the lens are embedded in the embedding groove of the lens assembly portion, wherein the lens has a first locking slot and a second locking slot, respectively, formed on the two sides of the lens, wherein the second locking slot of the lens is configured to be engaged with the second locking portion of the spectacle frame, wherein the side of the lens formed with the first locking slot is configured to initially pass through the first cut and the first gap for responsively positioning the first locking slot at least in the first assembly groove of the spectacle frame whereby the first latching member is resiliently engaged with a corresponding section of the first locking slot.

2. The snap-fit device for spectacle lens and spectacle frame as claimed in claim 1, wherein the second locking portion of the spectacle frame is formed as a locking protrusion at a corresponding inner surface of the spectacle frame, wherein the locking protrusion is correspondingly engaged with the second locking slot of the lens.

3. The snap-fit device for spectacle lens and spectacle frame as claimed in claim 1, wherein the first elastic portion of the first latching member of the spectacle frame includes a first elastic piece and a first supporting block protruding from the first elastic piece, wherein only one of two opposing end surfaces of the first elastic piece is connected with only the corresponding side portion of the first sidewall portion of the first latching member and thereby a remainder periphery of the first elastic piece not connected to the first sidewall portion remains physically separated from the first latching member, wherein the first supporting block is in abutting contact with a wall surface of a corresponding portion of a closed side section of the first assembly groove.

4. The snap-fit device for spectacle lens and spectacle frame as claimed in claim 1, wherein the first latching member further, includes, a first inclined surface formed at a bottom edge of a wall surface of the first sidewall portion adjacent to the first gap.

5. The snap-fit device for spectacle lens and spectacle frame as claimed in claim 1, wherein the second locking portion of the spectacle frame includes a second assembly groove formed at a corresponding inner surface of the spectacle frame for being intersected with a corresponding section of the embedding groove to thereby form a second cut at a portion of an intersection of the second assembly groove and the embedding groove, the second locking portion, further, including a second latching member disposed in the second assembly groove and the second latching member including at least a first sidewall portion formed within the second assembly groove to thereby be disposed internally with respect to the spectacle frame, wherein the first sidewall portion of the second latching member is pivotally connected to the second assembly groove at an end of the second latching member, and the second latching member, further, including a second gap formed within the second latching member to be correspondingly shaped with the second cut, wherein the second gap is formed at an end of the second latching member opposed to the end at which the second latching member is pivotally connected with the second assembly groove, wherein the first sidewall portion of the second latching member includes a second elastic portion arranged at a side portion thereof, the second elastic portion being formed through only the corresponding side portion of the first sidewall portion of the second latching member, thereby only the portion of the first sidewall portion of the second latching member through which the second elastic portion is formed is elastic, and a second pressing portion is formed at a surface of the second latching member physically separated from the first sidewall portion of the second latching member, wherein the second pressing portion protrudes out of an opening formed at an open side section of the second assembly groove, wherein the side of the lens with the second locking slot is initially configured to pass through the second cut and the second gap for responsively positioning the second locking slot at least in the second assembly groove of the spectacle frame, whereby the second latching member is resiliently engaged with a corresponding section of the second locking slot.

6. The snap-fit device for spectacle lens and spectacle frame as claimed in claim 5, wherein the second elastic portion of the second latching member of the spectacle frame includes a second elastic piece and a second supporting block protruding from the second elastic piece, wherein only one of two opposing end surfaces of the second elastic piece is connected with only the corresponding side portion of the first sidewall portion of the second latching member and thereby a remainder periphery of the second elastic piece not connected to the first sidewall portion of the second latching member remains physically separated from the second latching member, wherein the second supporting block is in abutting contact with a wall surface of a corresponding portion of a closed side section of the second assembly groove.

7. The snap-fit device for spectacle lens and spectacle frame as claimed in claim 5, wherein the second latching member of the spectacle frame, further, includes a second inclined surface formed at a bottom edge of a wall surface of the first sidewall portion of the second latching member adjacent to the second gap.

8. The snap-fit device for spectacle lens and spectacle frame as claimed in claim 1, wherein the spectacle frame further includes a first positioning portion arranged at substantially a middle section of the embedding groove of the lens assembly portion, wherein the lens further includes a second positioning portion arranged at substantially a middle section of the upper edge thereof to thereby be correspondingly aligned and engaged with the first positioning portion of the spectacle frame.

9. The snap-fit device for spectacle lens and spectacle frame as claimed in claim 8, wherein the first positioning portion of the spectacle frame is formed as a protruding post in the embedding groove, wherein the second positioning portion of the lens includes a transverse recess formed below and adjacent to the upper edge of the lens, wherein an oblique guide groove is chamfered in a downward direction from the upper edge of the lens to the transverse recess for being connected with the transverse recess, wherein an opening is formed at the upper edge of the lens for intersecting with the transverse recess and the oblique guide groove, wherein the protruding post of the first positioning portion of the spectacle frame is configured to be positioned and engaged with the transverse recess.

10. The snap-fit device for spectacle lens and spectacle frame as claimed in claim 9, wherein the spectacle frame further, includes, two ditches formed at two opposing sides of the protruding post at a corresponding inner surface of the spectacle frame, respectively, and a slope is formed at a bottom portion of the protruding post, wherein the ditches communicate with the embedding groove.

11. The snap-fit device for spectacle lens and spectacle frame as claimed in claim 8, wherein the first positioning portion of the spectacle frame is formed as a protruding post in the embedding groove, wherein the second positioning portion of the lens is formed as a longitudinal recess and is configured to be correspondingly positioned and engaged with the first positioning portion of the spectacle frame.

12. The snap-fit device for spectacle lens and spectacle frame as claimed in claim 1, wherein the first latching member, further, includes a second sidewall portion formed partially within the first assembly groove and in opposing relationship to the first sidewall portion, wherein the second sidewall portion is pivotally connected to the first assembly groove at the end of the first latching member at which the first latching member is pivotally connected to the first assembly groove, wherein each of the two first and second sidewall portions is integrally formed with respect to the first latching member and is pivotally connected with another one of the two first and second sidewall portions at the end of the first latching member pivotally connected with the first assembly groove, and wherein the first gap is formed between the two first and second sidewall portions at the end of the first latching member opposed to the end at which the first latching member is pivotally connected with the first assembly groove.

* * * * *